United States Patent [19]

Shields et al.

[11] 4,192,456
[45] Mar. 11, 1980

[54] HEATING SYSTEM FOR MACHINE OPERATOR'S CAB

[75] Inventors: Charles H. Shields; Gary D. Kane, both of Cedar Rapids, Iowa

[73] Assignee: Harnischfeger Corporation, West Milwaukee, Wis.

[21] Appl. No.: 935,468

[22] Filed: Aug. 21, 1978

[51] Int. Cl.² .............................................. B60H 1/02
[52] U.S. Cl. .................................. 237/12.3 R; 60/456; 122/26; 126/247; 237/12.3 A
[58] Field of Search ............ 237/12.3 R, 12.1, 12.3 A, 237/8 R; 60/456; 122/26; 126/247

[56] References Cited

U.S. PATENT DOCUMENTS

| | | | |
|---|---|---|---|
| 2,764,147 | 9/1956 | Brunner | 122/26 |
| 3,187,498 | 6/1965 | Firth et al. | 60/456 |
| 3,365,133 | 1/1968 | Norton et al. | 237/12.1 |
| 4,069,972 | 1/1978 | Hausmann | 237/12.3 R |
| 4,114,809 | 9/1978 | Sampson | 126/247 |
| 4,126,993 | 11/1978 | Grattapaglia et al. | 60/445 |
| 4,129,986 | 12/1978 | Heinrich | 60/456 |
| 4,136,824 | 1/1979 | Kallenbach | 60/456 |

*Primary Examiner*—Henry C. Yuen
*Attorney, Agent, or Firm*—James E. Nilles

[57] ABSTRACT

A machine, such as a self-propelled mobile crane, having an operator's cab and an engine for driving hydraulic pumps to supply fluid to hydraulic motors which drive crane components, is provided with a heating system for the operator's cab. The heating system comprises a heating system hydraulic pump driven by the engine, a fin-and-tube-type heat exchanger located in the cab, a pilot-fluid operated adjustable unloading pressure relief valve connected in circuit between the heating system hydraulic pump and the heat exchanger, and wherein hydraulic energy is converted to thermal energy because of a large pressure drop therein; a solenoid valve for adjusting the pressure relief valve to control the hydraulic fluid pressure drop and, therefore, temperature, and prevent excessive temperature; a first thermostat responsive to the hydraulic fluid temperature for controlling the solenoid valve; a motor-driven adjustable-speed fan in the cab for directing air across the heat exchanger to heat the air in the cab; and a rheostat or multispeed switch to control fan speed and, thus, the rate of heat transfer between the heat exchanger and the cab air and thus, cab air temperature.

6 Claims, 10 Drawing Figures

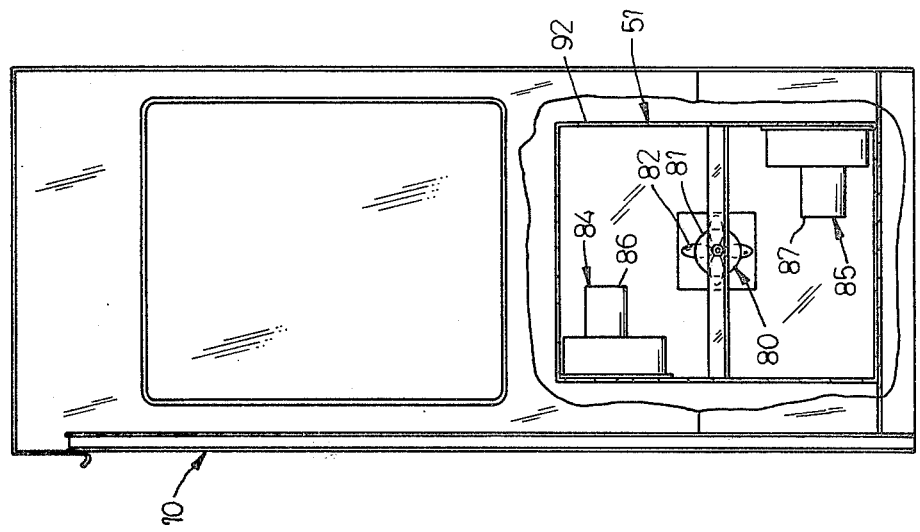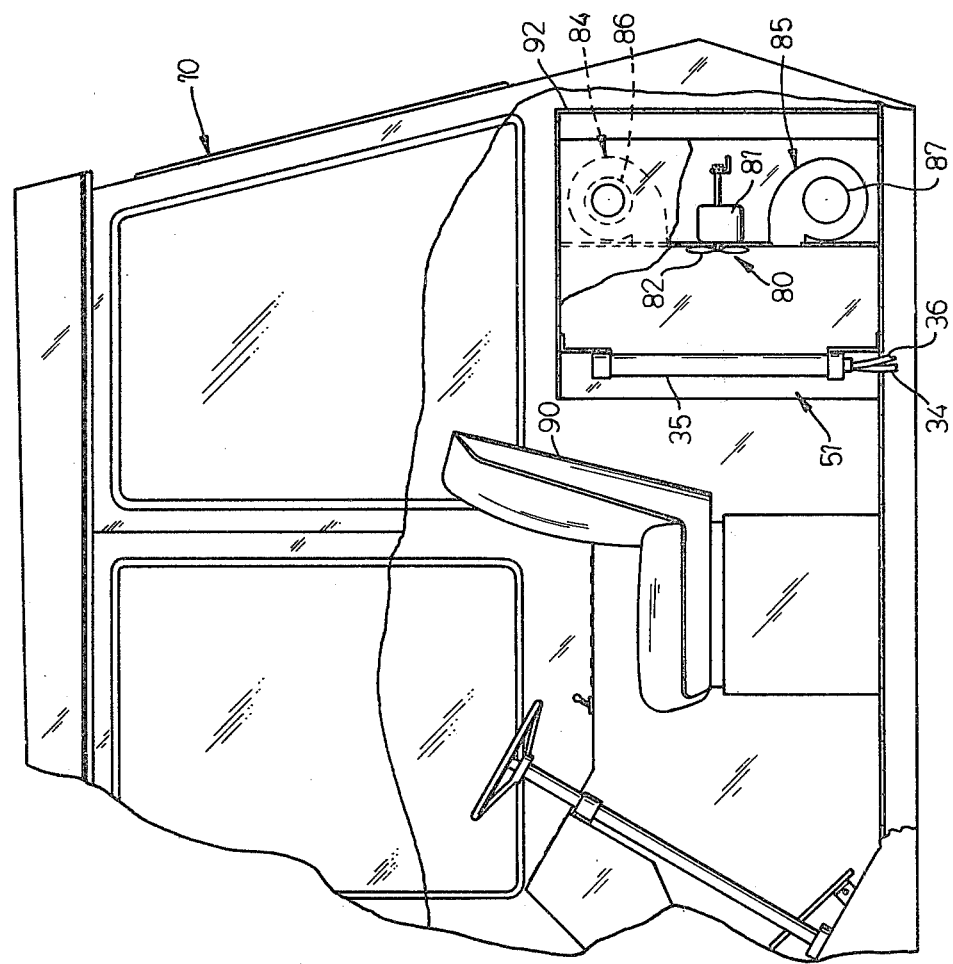

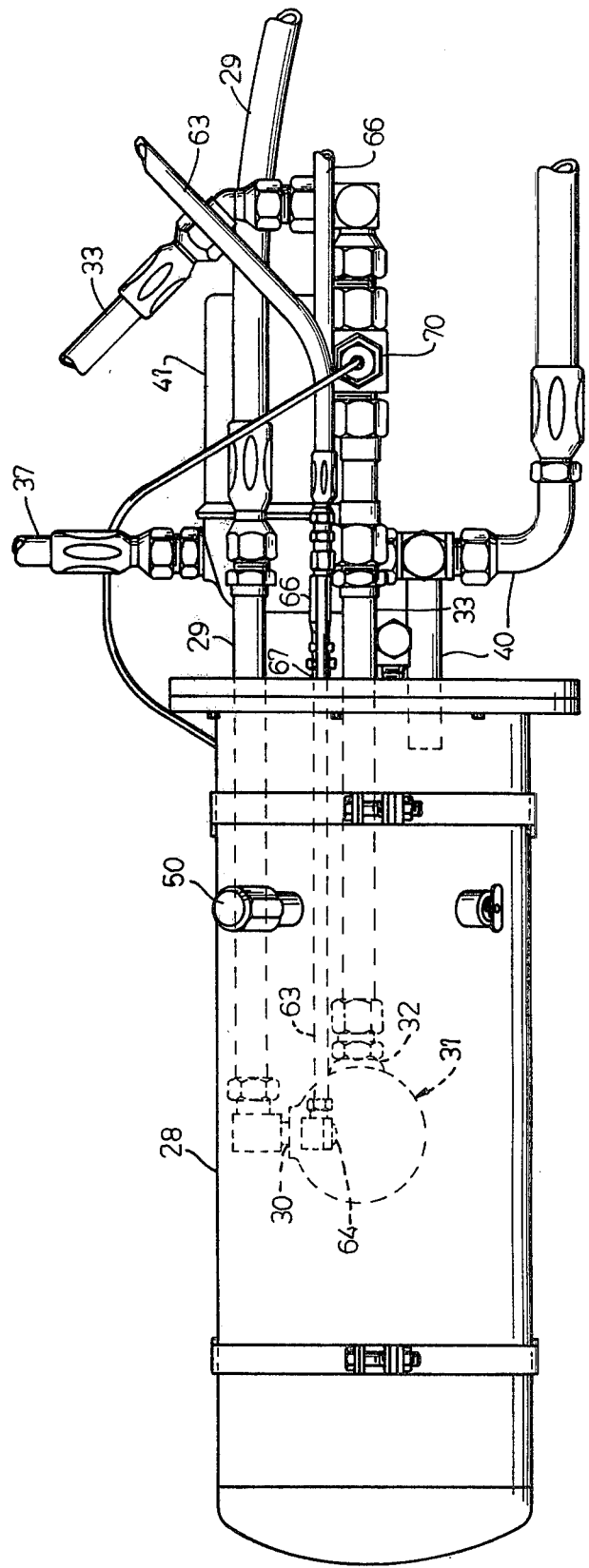

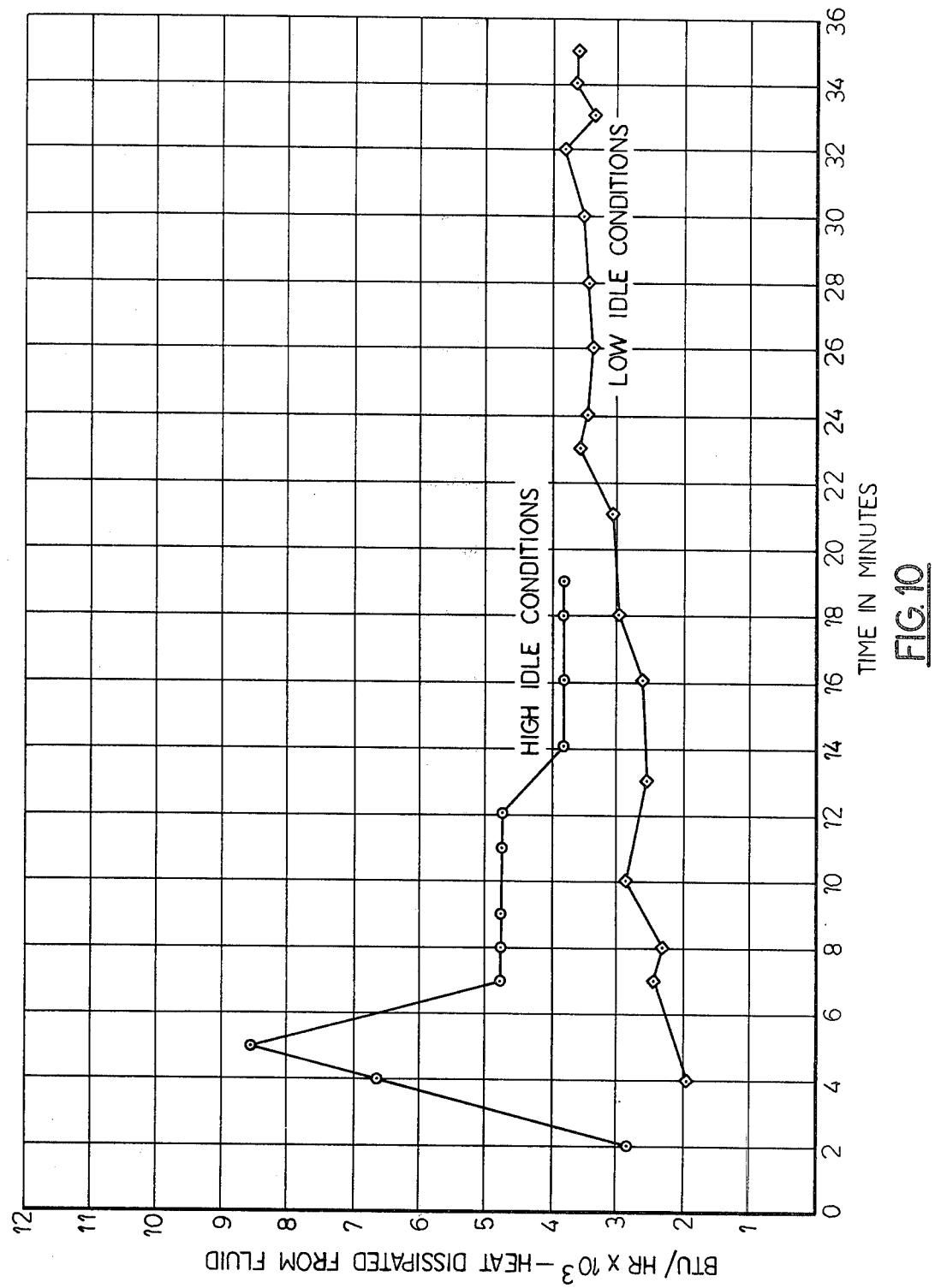

HEATING SYSTEM FOR MACHINE OPERATOR'S CAB

BACKGROUND OF THE INVENTION

1. Field of Use

This invention relates generally to heating systems and in particular to a flameless heating system for the operator's cab of machines, such as material handling machines, construction machines, mobile cranes, overhead cranes, trucks, tractors, or the like.

2. Description of the Prior Art

In machinery of the aforesaid character, it is important to provide a heating system for the operator's cab, and the prior art discloses several types. For example, electric heating systems employ a red-hot electrical resistance wire as the heat source and use a fan to distribute heat throughout the cab. Combustion-type heating systems use an enclosed flame, fueled by gasoline or fuel oil, for example, and a fan to distribute the heated air (see U.S. Pat. No. 2,567,143, for example). Several forms of flameless heaters also exist which extract heat by means of heat exchangers from heated fluids (such as coolant water or lubricating oil) supplied from an internal combustion engine used to propel and operate the machine. Some flameless heaters depend on expansion-/compression of compressible fluids to provide heat which is then distributed by a heat exchanger (see U.S. Pat. Nos. 3,365,133; 3,259,317; 3,214,100). All such prior art heating systems having certain disadvantages. For example, it is undesirable to employ machinery having heaters using red-hot wires or open flames in hazardous environments such as chemical plants, paint plants or other explosive atmospheres. On the other hand, prior art flameless heaters which depend on heated fluids (such as water or oil) supplied from an engine are ineffective unless the engine is in operation. Furthermore, those heating systems which depend on compression-/expansion of compressible fluids can be unduly complex and expensive and may require frequent servicing because of fluid losses.

In machinery which is hydraulically operated, i.e., that in which an internal combustion engine or electric motor drives one or more hydraulic pumps to supply hydraulic motors which operate machine components, it is known that heat is generated in the hydraulic system as a result of dumping a liquid, such as hydraulic fluid, water, or oil, from a higher to a lower pressure without doing mechanical work, i.e., as when liquid bucks a system relief valve or because of normal pressure losses resulting from the hydraulic fluid flowing through system piping, valving, etc. This phenomena is described in detail at pages 32 and 33 of the "Fluid Power Data Book" First Edition, 3rd printing 1967, published by Womack Machine Supply Company, 2010 Shea Road, P.O. Box 35027, Dallas, Tex. 75235. However, this publication is concerned with the dangers of fluid overheating and heat build-up and teaches dissipation of excessive heat to atmosphere by means of oil tanks or oil coolers. Insofar as applicant is presently aware, the prior art contains no teaching to employ these principles for a heating system in the operator's cab of a hydraulic machine or the like.

SUMMARY OF THE INVENTION

In accordance with the invention, there is provided a heating system for the operator's cab of a machine, such as a self-propelled mobile crane, having an operator's cab and an engine for driving hydraulic pumps to supply fluid to hydraulic motors which drive crane components. The heating system comprises a heating system hydraulic pump driven by the engine, a fin-and-tube-type heat exchanger located in the cab, a pilot-fluid operated adjustable unloading pressure relief valve connected in circuit between the heating system hydraulic pump and the heat exchanger, and wherein hydraulic energy is converted to thermal energy because of a large pressure drop therein; a solenoid valve for adjusting the pressure relief valve to control the hydraulic fluid pressure drop and thereoofre, temperature, and prevent excessive temperature; a first thermostat responsive to the hydraulic fluid temperature for controlling the solenoid valve; a motor-driven adjustable-speed fan in the cab for directing air across the heat exchanger to heat the air in the cab; and a rheostat or multi-speed switch to control fan speed and, thus, the rate of heat transfer between the heat exchanger and the cab air and thus cab air temperature.

A flameless heating system in accordance with the invention provides a safer means of supplying heated air to the operator's cab of a vehicle than those systems using an open flame or red hot resistance wire, especially on those machines operated in hazardous environments, such as chemical plants, paint plants, or other explosive atmospheres.

A heating system in accordance with the invention is advantageously employed or hydraulically operated machinery in which a hydraulic system already exists, but could be employed in machinery which is not hydraulically powered.

A heating system in accordance with the invention is relatively simple as regards principles of operation and construction, employs commercially available components and is fool-proof and trouble-free in operation.

Other objects and advantages of the invention will hereinafter appear.

BRIEF DESCRIPTION OF THE DRAWINGS

FIG. 2 is a side elevational view of a machine operator's cab, with portions broken away, and showing a heater disposed therein in accordance with the invention;

FIG. 3 is an end elevational view of the cab and heater shown in FIG. 2;

FIG. 4 is an enlarged side elevational view of a hydraulic heater reservoir shown in FIG. 1;

FIG. 10 is a graph depicting the time/heat dissipation relationship in the embodiment shown in FIGS. 6 and 7.

DESCRIPTION OF A PREFERRED EMBODIMENT

First Embodiment

Figure 1:
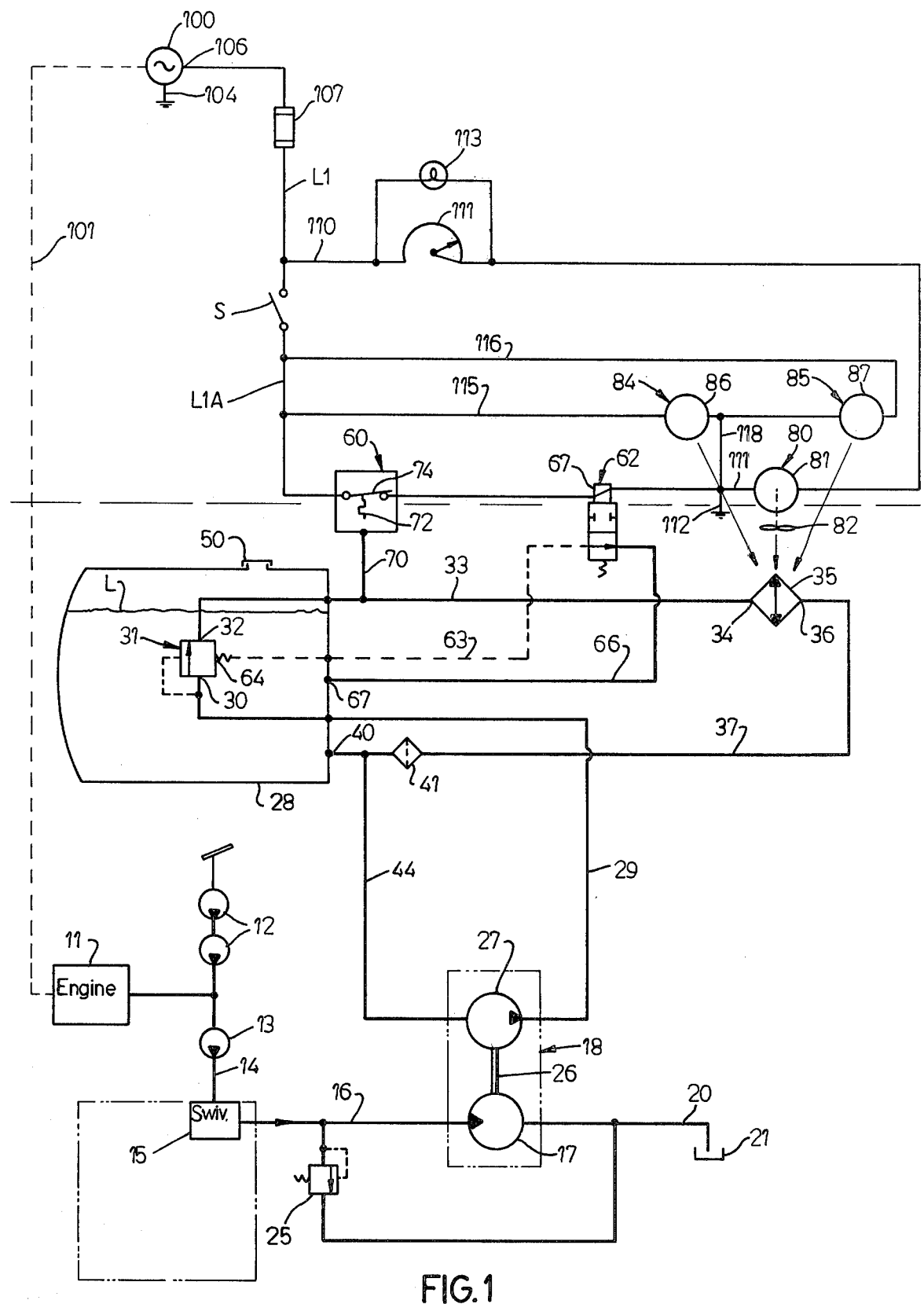
FIG. 1 is a schematic diagram of the electro-hydraulic circuitry of a first embodiment of a flameless heater system for a machine operator's cab in accordance with the invention.

Referring to FIG. 1, there is shown a schematic diagram of a flameless heating system for the operator's cab of a machine, such as a mobile crane. The system employs the principle of converting hydraulic energy into thermal energy which is then utilized to heat the air in the cab.

Figure 6:
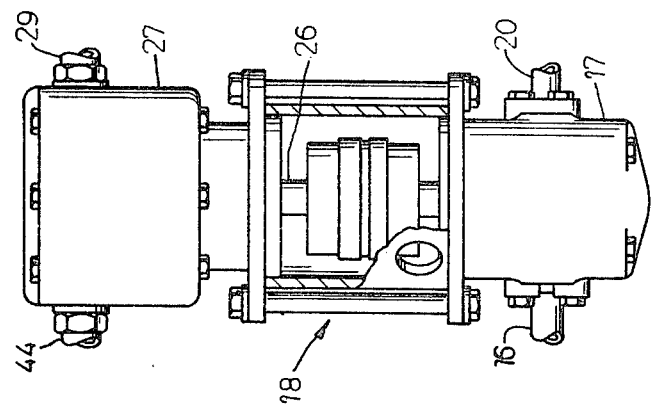
FIG. 6 is an enlarged side elevational view of a motor/ pump unit shown in FIG. 1.
Figure 5:
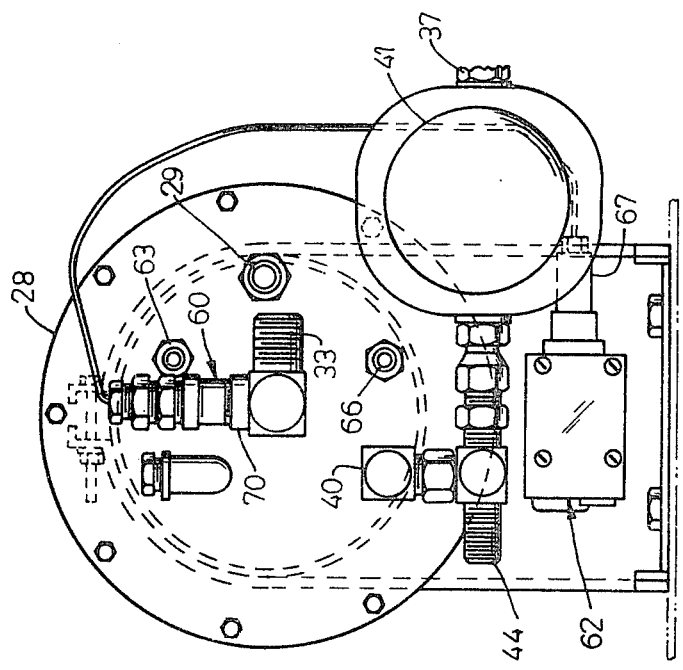
FIG. 5 is an elevational view of the right end of the hydraulic heater reservoir shown in FIG. 4.

Referring to FIG. 1, the system comprises a prime mover, such as an internal combustion engine 11, which is employed in the crane for propulsion purposes and to drive hydraulic pumps 12 which supply hydraulic fluid to hydraulic motors (not shown) which operate movable elements on the crane. Engine 11 is understood to be located, for example, on the mobile lower section of the crane, whereas the operator's cab 10, as shown in FIGS. 2 and 3, is located on the rotatable upper section (not shown) of the crane. Engine 11 drives a hydraulic pump 13 which supplies hydraulic fluid for the hydraulic circuit of the flameless heating system. The outlet port of pump 13 is connected by a fluid line 14, through a hydraulic swivel 14 (interconnected between the lower and upper crane sections), to a fluid supply line 16. Supply line 16 is connected to the fluid inlet port of a hydraulic motor 17 which is part of an intensifier unit 18 hereinafter described. Hydraulic motor 17 is provided with a fluid return line 20 which discharges into a main hydraulic reservoir 21 which is understood to be mounted on the crane. A pressure relief valve 25 is connected between the inlet and outlet ports of hydraulic motor 17 and is of conventional construction and employed for conventional relief purposes. Intensifier 18 includes the hydraulic motor 17 hereinbefore referred to which is connected by a drive shaft 26 to drive a hydraulic pump 27 hereinafter referred to as the heater circuit pump. Intensifier 18, shown in FIGS. 1 and 6, is a commercially available combined hydraulic motor/pump unit, such as the Vickers V2020F intensifier unit capable of supplying 23 gallons per minute of hydraulic fluid at 2500 RPM. The pressure port of heater circuit pump 27 is connected by a fluid line 29 to the fluid inlet port 30 of an unloading relief valve 31 which is physically located within a hydraulic heater reservoir 28 (see also FIGS. 4 and 5). The fluid outlet port 32 of pressure relief valve 31 is connected by a fluid line 33 to the inlet port 34 of a fin-and-tube-type heat exchanger 35. A fluid outlet port 36 of heat exchanger 35 is connected by a fluid line 37 to a fluid inlet port 40 of heater reservoir 28. Line 37 is provided with a filter 41 therein for filtering the fluid and thereby increasing component life. Fluid line 37 is also connected and supplies fluid through a fluid line 44 to the inlet port of heater circuit pump 27. Heater reservoir 28 contains a supply of hydraulic fluid up to a level L, for example, in which the relief valve 31 is physically submerged and port 40 makes this fluid supply available as make-up fluid for heater circuit pump 27 or receives excessive fluid in the system, i.e., reservoir 28 is provided to allow for fluid expansion and contraction by port 40. Heater reservoir 28 is provided with a breather cap 50 which is used to maintain a positive head on the inlet port of the heater circuit pump 27 when the fluid in reservoir 28 is heated as a result of the action of relief valve 31. This helps to minimize cavitation and eliminate air entrapment in the oil or hydraulic fluid being supplied to heater circuit pump 27. Hydraulic energy is converted to thermal energy by adjusting unloading relief valve 31 so as to create a large pressure drop or pressure differentiation therein, without doing any appreciable amount of mechanical work. The increase in thermal energy resulting from hydraulic fluid flow through relief valve 31 raises the temperature of the fluid being circulated from heater circuit pump 27, through relief valve 31 and through heat exchanger 35 back to pump 27. The thermal energy imparted to the fluid in supply line 33 by the hereinbefore described action of unloading relief valve 31 is transferred to, and released from, heat exchanger 35 which, as FIGS. 2 and 3 show, is physically located in a heater unit 51 in the operator's cab 10, hereinafter described in detail.

The unloading relief valve 31 is adjustable or actuatable so as to control fluid temperature and to prevent excessive fluid temperature from occurring. Means are provided to monitor or sense fluid temperature and to adjust unloading pressure relief valve 31 to thereby regulate fluid temperature and such means comprise an oil temperature-sensitive control switch 60 for controlling a two position, two way, normally opened, solenoid controlled valve 62 which is connected to operate, control, or regulate unloading relief valve 31. More specifically, solenoid valve 62 is connected by a pilot fluid line 63 to a pilot fluid port 64 of relief valve 31 and is also connected by pilot fluid return line 66 to a port 67 in hydraulic heater reservoir 28. Electrical energization of the solenoid 67 of solenoid valve 62 effects closure of solenoid valve 62 and causes relief valve 31 to operate in such a manner as to open wider and thereby reduce the pressure drop therein, thereby reducing oil temperature. Deenergization of solenoid 67 effects reopening of solenoid valve 62 and closure of relief valve 31 in such a manner as to increase the pressure drop and correspondingly increase fluid temperature. Oil temperature sensing unit 60 is connected by a fluid line 70 to fluid line 33. Unit 60 includes a temperature responsive element 72 which is responsive to the temperature of the fluid supplied fo line 70 to actuate a normally open switch 74. Switch 74 is connected in series circuit with solenoid coil 67 of the solenoid valve and effects operation of the solenoid valve 62 as hereinbefore described, i.e., switch 74 opens when fluid temperature is relatively low and closes when fluid temperature is relatively high. As will be understood, unit 74 is adjustable so that a desired temperature or temperature range may be selected to effect switch actuation.

As FIGS. 1, 2, and 3 show, heater unit 51 includes the heat exchanger 35 hereinbefore described, a fan 80 which includes a fan motor 81 and a fan blade 82, and a pair of blowers 84 and 85 which include blower motors 86 and 87, respectively. As hereinafter explained, during operation of the heating system, the blowers 84 and 85 are in constant operation to maintain general air circulation and the speed of fan 80 can be adjusted (or thermalstatically adjusted) so as to increase or decrease the amount of air being forced over the heat exchanger 35 by fan blade 82 and thereby regulate the rate of heat transfer from the heat exchanger to the air within the cab 10. As FIGS. 2 and 3 show, heating unit 51 is preferably located on the floor of the cab behind and near the machine operator's seat 90 so as to be most effective in circulating and warming the cab air. Heater unit 51 comprises an appropriate housing 92 in which the blowers 84 and 85, the fan 80, and the heat exchanger 35 are suitably mounted.

As FIG. 1 shows, the electrical components in the system are energizable from an electrical generator 100 which is connected by a drive means 101 to be driven by internal combustion engine 11, and generator 100 may be physically located on the engine. Generator 100 has a grounded terminal 104 which is suitably grounded and a power terminal 106 which is connected in series with a fuse 107 to an electric power supply line L1. Line L1 is connectable through a manually operable single pole single throw main switch S, shown in open position in FIG. 1, to a supply line L1A. Line L1 is connected by a conductor wire 110, through rheostat 111, to one side of fan motor 81. The other side of fan motor 81 is connected by a conductor 111 to a grounded terminal 112. If preferred, a lamp 113 may be connected in parallel with rheostat 111 as shown in FIG. 1. Rheostat 111 is manually operable by the machine operator to turn fan 82 on and off and to adjust the speed thereof to suit the operator, regardless of the position of main switch S. The blower motors 86 and 87 each have one side connected to supply line L1A by conductors 115 and 116, respectively, and have their other side connected by a conductor 118 to grounded terminal 112. Actuation of main switch S controls operation of the blowers 84 and 85. The solenoid coil 67 of solenoid valve 62 is connected in series with switch 74 of sensing unit 60 between line L1A and grounded terminal 112. Thus, when main switch S is closed, actuation of switch 74 by temperature-responsive element 72 controls energization of the solenoid coil 67.

Second Embodiment

Figure 8:
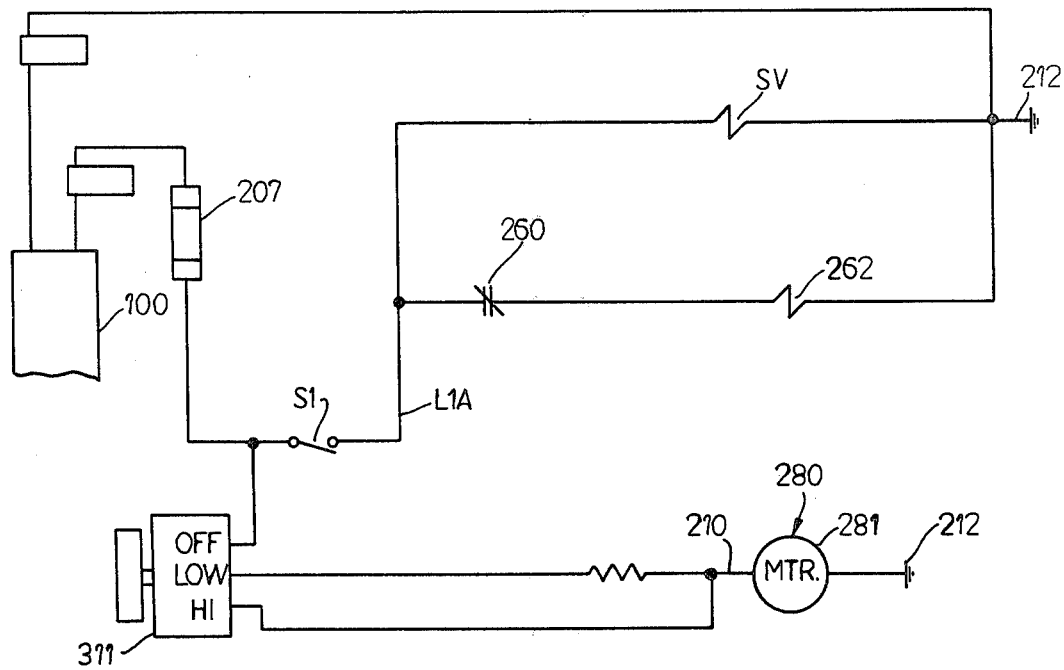
FIG. 8 is a schematic diagram of the electric circuitry for the hydraulic circuitry shown in FIG. 3.
Figure 7:
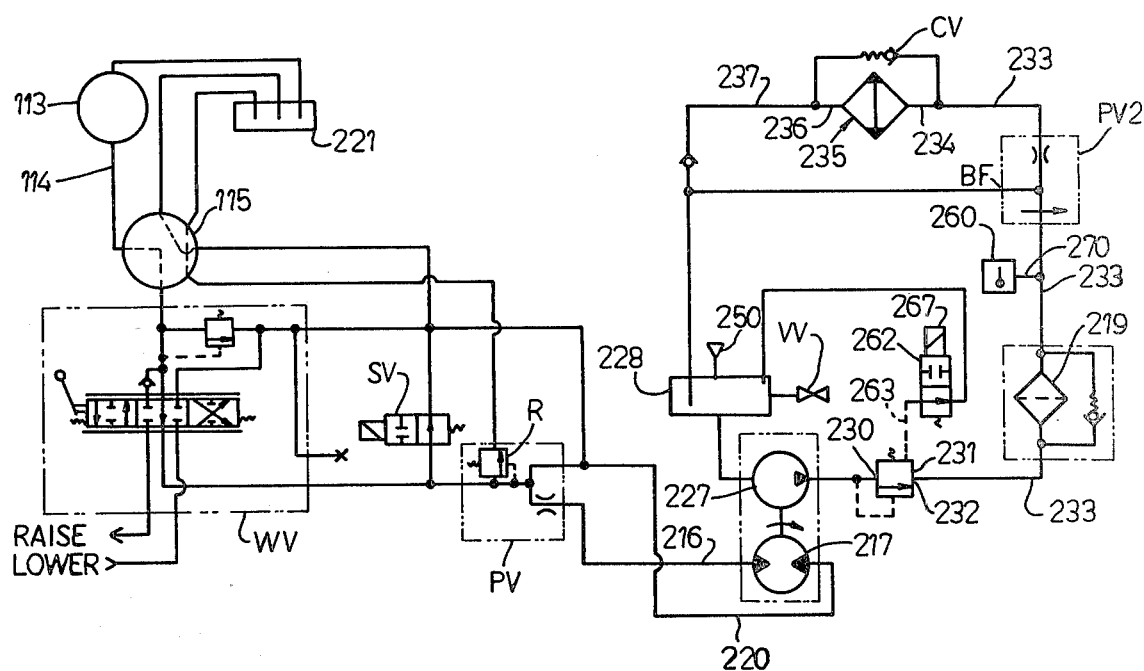
FIG. 7 is a schematic diagram of the hydraulic circuitry of a second embodiment of a flameless heater system in accordance with the invention.

The flameless heating system shown in FIGS. 7 and 8, is designed to operate in a crane having a three-speed main winch (not shown) and utilizes a pump 113 by means of which fluid is directed through a swivel 115 to a slow winch control valve WV. The winch control valve WV incorporates a high pressure carryover option, so that when the slow winch control valve is in the neutral position, fluid, such as a fire-resistant mixture of water/glycol, is available to drive the flameless heater circuit. When the control valve WV is activated into the winch mode (raise or lower), fluid is directed to the winch circuit only, therefore the winch circuit has priority over the flameless heater circuit.

With the control valve WV in the neutral position and the heater toggle switch S1 (see FIG. 8) in the off position, fluid is directed back to the main hydraulic reservoir 221 through a two-way, two-position, normally open, solenoid valve SV at low pressure to minimize power losses. When the solenoid valve SV is energized, fluid is blocked from returning to the reservoir 221, and is directed to a priority flow control valve PV.

The priority flow control valve PV directs a controlled amount of fluid (16.5 gpm, for example) to the hydraulic motor 217, therefore regulating the maximum obtainable speed of the hydraulic motor. The excess flow coming from the pump 113 is directed back to the main hydraulic reservoir 221 through the excess flow port EF. The priority flow control valve PV has a built-in relief valve R to provide overpressurization protection of the circuit at 2000 psi, should the hydraulic motor stall out.

The output torque of the hydraulic motor 217 is used to drive a positive displacement hydraulic gear pump 227 in the flameless heater circuit. Fluid leaving the pump outlet is directed to a vented relief valve 231. The vented relief valve 231, used in conjunction with a two-way, two-position, normally open solenoid valve 262, acts as an unloading valve. When the solenoid valve 262 is not energized, the fluid is pumped at low pressure through the circuit back to the auxiliary reservoir 228. When the solenoid valve 262 is energized, the spring chamber of the relief valve 231 is not vented and the fluid pressure must increase to overcome the spring setting (1500 psi, for example) of the relief valve 231.

Fluid leaving the relief valve 231 is filtered using a 40 micron filter 219, and is directed to a priority flow control valve PV2. A temperature switch 260, located upstream of the priority valve PV2, is wired to open when the fluid temperature reaches 140° F., for example. Opening the temperature switch 260, short circuits the solenoid valve 262, thereby unloading the pump 227.

The priority flow control valve PV2 regulates fluid at a maximum flow rate of 5 gpm, for example, to the heater 235. The excess fluid flow is routed back to the auxiliary reservoir 228 through the bypass flow port BF of the valve PV2. Although all of the heat energy of the fluid is not being utilized in the heater core, the excess flow allows for a faster heatup of the fluid, thereby increasing the temperature rise rate of the fluid when compared to the air temperature rise rate.

An automotive hot water heater 235, of the honeycomb-type construction, is used to transfer heat energy from the fluid to the air of the cab. The heater core is rated, for example, at 40,000 BTU/HR at a differential temperature (temperature of entering fluid minus entering air temperature) of 150° F. The heater fan 280 has an air delivery rate of 415 cubic feet per minute, for example. The fan motor 281 is wired so that it can be used to circulate air when the heater is off. A two-position switch 311 provides for high and low fan speeds. An air deflector may be used to direct the air flow to the desired areas inside the cab. The heater core is protected from overpressurization by using a spring loaded check valve CV as a safety relief.

Fluid exiting from the heater 235 is directed back into the auxiliary reservoir 228. The reservoir 228, using an air relief valve 250, becomes pressurized as the fluid expands due to the increasing temperature. This pressurization helps to force fluid into the suction side of the pump 227 and reduces the possibility of cavitation. A vent valve VV is provided to depressurize the reservoir 228 when necessary. A limitation on the amount of initial fluid in the reservoir is set to ensure that the expanding fluid will not increase to the point that it comes out of the air relief valve 250 or the vent valve VV.

Figure 9:
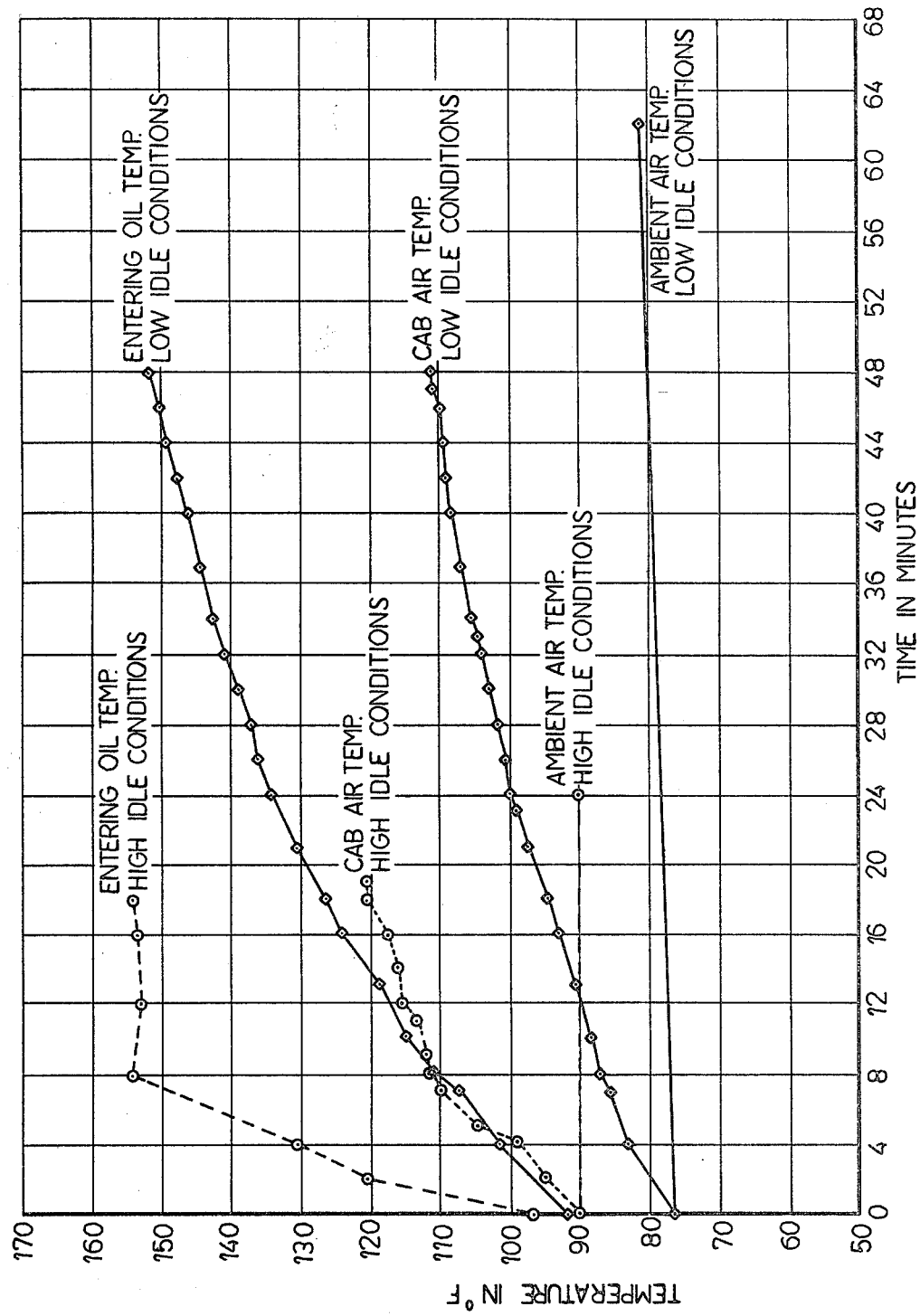
FIG. 9 is a graph depicting the time/temperature relationship in the embodiment shown in FIGS. 6 and 7.

The graphs in FIGS. 9 and 10 depict typical operating conditions of the heater system shown in FIGS. 7 and 8 and are self-explanatory as to depicted relationships in a preferred embodiment.

We claim:
1. A heating system comprising:
a hydraulic pump;
means for driving said pump;
a heat exchanger connected to said hydraulic pump;
a pressure relief valve connected between said hydraulic pump and said heat exchanger wherein hydraulic energy is converted to thermal energy as a result of a hydraulic fluid pressure drop in said pressure relief valve, said pressure relief valve being adjustable to change the fluid pressure drop therein and thereby change the hydraulic fluid temperature;

means responsive to hydraulic fluid temperature for adjusting said pressure relief valve to regulate the hydraulic fluid temperature;

and a fan for directing air across said heat exchanger to effect heat transfer to said air.

2. A heating system according to claim 1 wherein the speed of said fan is adjustable to change the heat transfer rate from the heat exchanger to the air; and further including means for adjusting the speed of said fan to regulate the air temperature.

3. A heating system according to claim 1 wherein said adjustable pressure relief valve is a pilot fluid controlled pressure relief valve and wherein said means responsive to the temperature of the hydraulic fluid includes a solenoid valve for regulating the pilot fluid for said pressure relief valve and thermostat means responsive to the temperature of the hydraulic fluid being supplied from said pressure relief valve for controlling energization of said solenoid valve.

4. In a machine having an operator's cab and a prime mover:
a heating system for said operator's cab comprising:
a hydraulic pump driven by said prime mover;
a heat exchanger in said operator's cab;
an adjustable pressure relief valve connected in circuit between said hydraulic pump and said heat exchanger and wherein hydraulic energy is converted to thermal energy as a result of the fluid pressure drop therein;
means responsive to the temperature of the hydraulic fluid for adjusting said pressure relief valve to regulate the pressure drop therein and thus regulate fluid temperature;
and a fan for directing the air across said heat exchanger to heat said air.

5. A machine according to claim 4 wherein said adjustable pressure relief valve is a pilot fluid controlled pressure relief valve and wherein said means responsive to the temperature of the hydraulic fluid includes a solenoid valve for regulating the pilot fluid for said pressure relief valve and thermostat means responsive to the temperature of the hydraulic fluid being supplied from said pressure relief valve for controlling energization of said solenoid valve.

6. A machine according to claim 1 wherein the speed of said fan is adjustable to change the heat transfer rate from the heat exchanger to the air; and further including means for adjusting the speed of said fan to regulate the air temperature.

* * * * *